United States Patent [19]
Hinojosa

[11] Patent Number: 5,608,806
[45] Date of Patent: Mar. 4, 1997

[54] AUDIO SPEAKER MOUNTS FOR OFF-ROAD VEHICLES

[75] Inventor: Ruben Z. Hinojosa, Huntington Beach, Calif.

[73] Assignee: Christy A. Cassel, Huntington Beach, Calif.; a part interest

[21] Appl. No.: 295,986

[22] Filed: Aug. 25, 1994

[51] Int. Cl.[6] ................................................. H04R 5/00
[52] U.S. Cl. .................................... 381/86; 381/24
[58] Field of Search ........................ 381/86–88, 24

[56] References Cited

U.S. PATENT DOCUMENTS

| | | | |
|---|---|---|---|
| D. 302,518 | 8/1989 | Ellison | D8/354 |
| 4,099,026 | 7/1978 | Persson et al. | 179/1 VE |
| 4,100,372 | 7/1978 | Hypolite | 179/1 G |
| 4,637,049 | 1/1987 | Kunugi | 381/86 |
| 4,733,748 | 3/1988 | Ponticelli et al. | 181/141 |
| 4,866,776 | 9/1989 | Kasai et al. | 381/24 |
| 4,905,860 | 3/1990 | Kurihara et al. | 220/72 |
| 5,094,316 | 3/1992 | Rosen | 181/141 |
| 5,228,090 | 7/1993 | Marler | 381/86 |

*Primary Examiner*—Stephen Brinich
*Attorney, Agent, or Firm*—James G. O'Neill

[57] ABSTRACT

Audio speaker assembly mounts for a vehicle, and particularly an open vehicle, such as an off-road vehicle, to provide improved audio sound to the passengers of the vehicle and to prevent theft of the speakers mounted in the normally opened vehicle. The mounts include speaker box kits that are affixed to sport rollbars of the vehicle, and consist of at least one pair of elongated shells fixedly secured together in a watertight configuration to a section of the rollbars, and has at least on locking element therein so as to secure the kits together and to the rollbars as well as secure the speakers and other equipment held within the elongated shells.

20 Claims, 3 Drawing Sheets

AUDIO SPEAKER MOUNTS FOR OFF-ROAD VEHICLES

BACKGROUND OF THE INVENTION

1. Field of the Invention

This invention relates generally to audio speaker mounts, and more particularly, to an improved audio speaker assembly for securing and locking audio equipment to the rollbar of a vehicle.

2. Description of Related Art

As the popularity of sports utility vehicles has dramatically increased over the past few years, the theft or unauthorized removal of radios and other audio equipment mounted therein, has also risen significantly. Furthermore, since many of these sport utility vehicles, such as Jeep Wranglers, have soft or removable tops, and are driven on many occasions without tops, the currently available audio systems provided, as original or after market equipment, in such vehicles do not provide adequate sound that can be heard and enjoyed by the passengers in the vehicle. This is caused, among other reasons, because of the stiff and noisy ride of such vehicles when traveling, on roads, or particularly when being operated used off-road.

Prior art devices have been proposed to overcome these known disadvantages. One such device is set forth in U.S. Pat. No. 5,094,316 to Rosen, which discloses an elongated overhead speaker system, including an elongated support member having two ends, adapted to be mounted to opposed lintels (or sports bars) of a vehicle to extend across the ceiling of the vehicle. The overhead speaker system of Rosen also includes fastening elements mounted perpendicularly to the elongated support member for securing the elongated support member to the vehicle. At lease one and preferably two speakers are mounted to the elongated support member. Although the overhead speaker system of Rosen provides additional security and safety, it does not always provide the needed sound quality for an off-road vehicle, or dissuade a determined thief, nor is it easy to use and/or install.

Other types of overhead or mounting means for speakers are known for automobiles, pickup trucks and/or sports utility vehicles, are shown in the following listed U.S. Pat. Nos.:

| | |
|---|---|
| Des. 302,518 | Ellison |
| 4,099,026 | Persson et al. |
| 4,100,372 | Hypolite |
| 4,637,049 | Kunugi |
| 4,733,748 | Ponticelli, Jr. |
| 4,866,776 | Kasai et al. |
| 4,905,860 | Kurihara et al. |
| 5,228,090 | Marler |

Although these patents solve some of the specific problems with the mounting of audio systems and/or speakers in certain areas of selected vehicles, they do not solve all of the known problems of audio distortion and prevention of theft, specifically in open, off-road vehicles. Therefore, there exists the need for a simple, low-cost and easy to manufacture, install and use speaker mounting means or system, useful in many situations, but which is particularly useful for installation in sports utility vehicles having rollbars, so as to provide improved quality sound to a vehicle, while at the same time ensuring that the speakers and housings carrying the same are securely locked to the rollbar of the vehicle, in a preselected position.

SUMMARY OF THE INVENTION

Accordingly, it is a general object of the present invention to provide improved speaker mounting assemblies. It is a particular object of the present invention to provide improved speaker mounting assemblies which are easy to manufacture, assemble, install and use. It is a still more particular object of the present invention to provide speaker mounting assemblies which are readily added to existing rollbar installations in vehicles. It is yet a more particular object Of the present invention to provide speaker mounting assemblies having pairs of elongated housing members easily mounted to or removable from each other, but which securely lock together over the rollbar of a vehicle to which they are mounted, to hold speakers in place at preselected locations. It is a further object of the present invention to provide speaker mounting assemblies which contain an internal locking mechanism for locking the speaker mounting assemblies in position. It is yet another object of the present invention to provide improved speaker housing assemblies for use in locking a plurality of speakers to a vehicle, and in which the locking means is combined with the speaker housing assemblies to prevent unauthorized removal of the speakers from a vehicle. And, it is yet a further object of the present invention to provide improved speaker mounting means, having at least one key operated locking assembly which allows the speaker mounting means to be quickly installed in, and readily adapted for use on, substantially any sports utility vehicle, to replace or enhance the existing audio system.

In accordance with one aspect of the present invention, there is provided audio speaker mount means for a vehicle having a rollbar, to provide improved audio sound to the passengers of the vehicle, and to prevent theft of the audio speakers mounted in the vehicle by means of at least one pair of elongated shells fixedly secured and locked together in a watertight configuration to a section of the rollbar, with a plurality of securing means and at least one locking mechanism therein.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Figure 1:
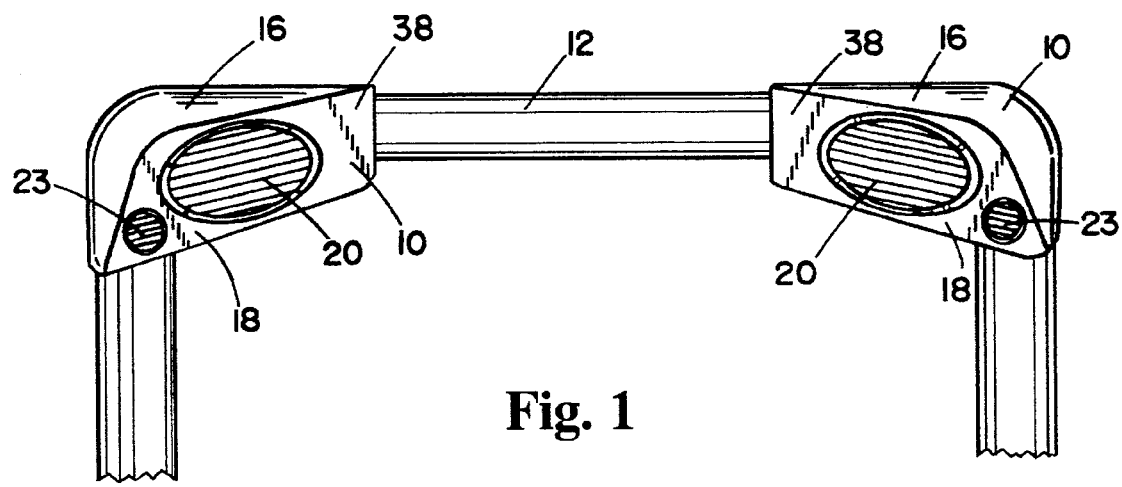
FIG. 1 is a partial front elevational view of a rollbar assembly for a vehicle with a preferred embodiment of the speaker mounting assemblies of the present invention, mounted to opposite ends of the rollbar.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to describe an improved speaker mounting or housing assembly, identified generally at 10, preferably mounted in pairs, for use in holding and securing speakers to a rollbar or sports bar 12 of a vehicle, such as an off-road or sports utility vehicle, having a soft top or its top removed, generally indicated at 14.

It is to be understood that the present invention provides for at least one and preferably two speaker mounting assemblies, and means for securing and locking such speaker mounting assemblies to the rollbar of substantially any vehicle, but which is particularly useful for and specifically described herein, for purposes of description only and not by way of limitation, for locking speakers in place, at the two highest corners of the rollbar 12 of a sports utility vehicle, such as Jeep Wrangler, or the like.

Turning now to FIGS. 1–5 of the drawings, the speaker mounting assemblies 10 of the present invention are shown as being formed as speaker box kits or assemblies having a plurality of cooperating components or elements, including a pair of specifically contoured and shaped, elongated shells 16, 18, that may take any desired shape, and may be made from any available material that is waterproof and strong enough to resist abrasion, corrosion, and tampering with, such as metal or plastic. The shells 16, 18 are formed, as by molding, to provide a complementary pair that include internal openings which are sized and dimensioned so that when the shells 16 and 18 are secured together they will snugly fit around the rollbar of a vehicle, and preferably around opposite corners of the rollbar 12. One or more speakers 20, 23 may be held and in each assembly 10, or other accessories, such a light may be used in place of the smaller speaker 23, if desired. The speakers 20, 23 are mounted in the assemblies so as to direct the sound emanating therefrom in any preselected direction, such as toward the driver and a front passenger, if any, in the vehicle. It is to be understood that the speaker mounting assemblies 10 could be mounted with the speakers facing in other directions, and/or on the rear supports 22 of the rollbar 12 (see FIG. 5) to direct the sound differently. Also, if desired, two pairs of speaker mounting assemblies 10 could be mounted on both of the upper corners of rollbar 12, as shown, and on the rear supports 22, for further and enhanced audio effect.

Figure 4:
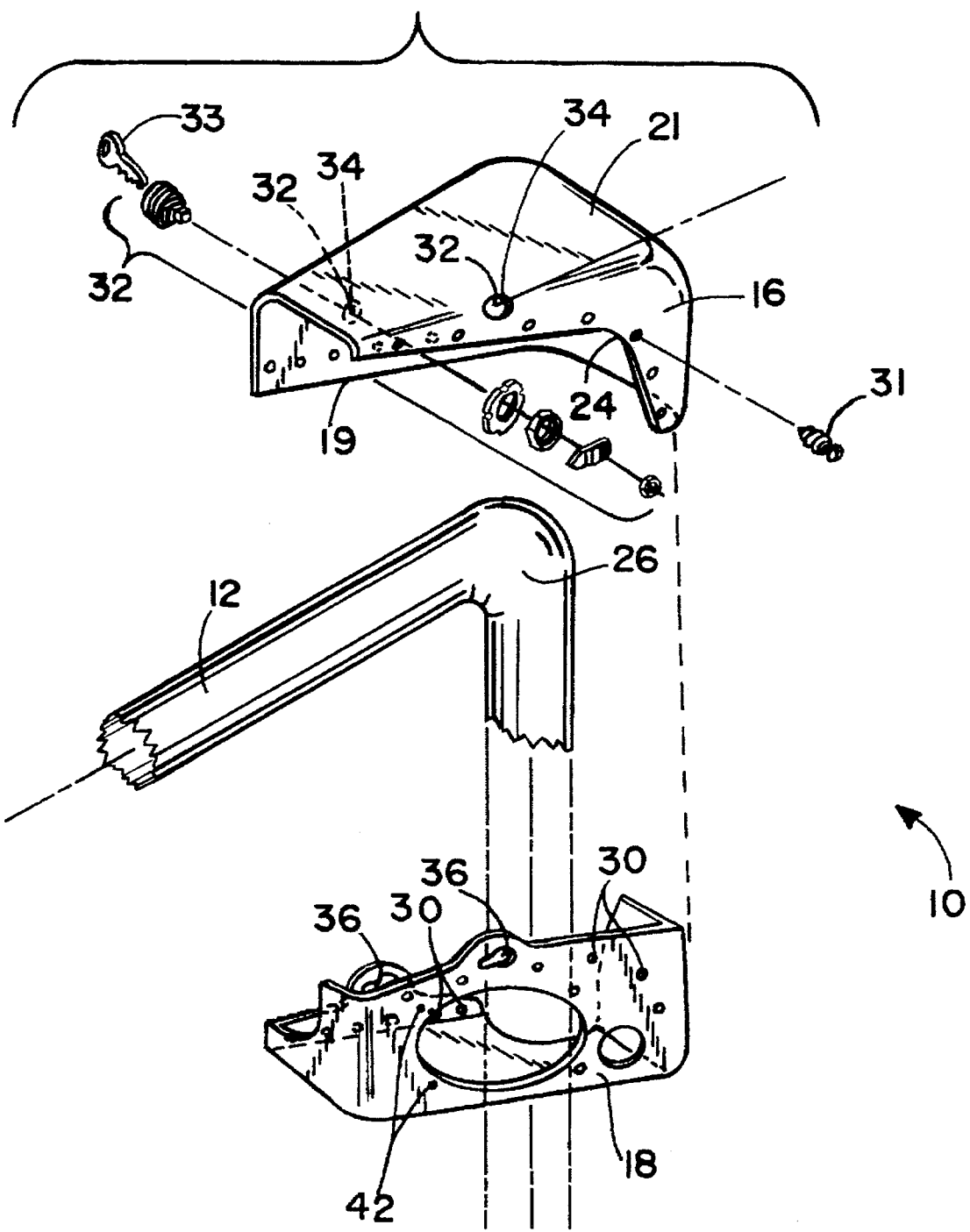
FIG. 4 is a partial exploded perspective view of one of the speaker mounting assemblies shown in FIG. 3, with its two sections apart and removed from a corner of the rollbar, including one embodiment of a key operated locking mechanism, and securing means for holding the two sections of the speaker mounting assembly together.
Figure 5:
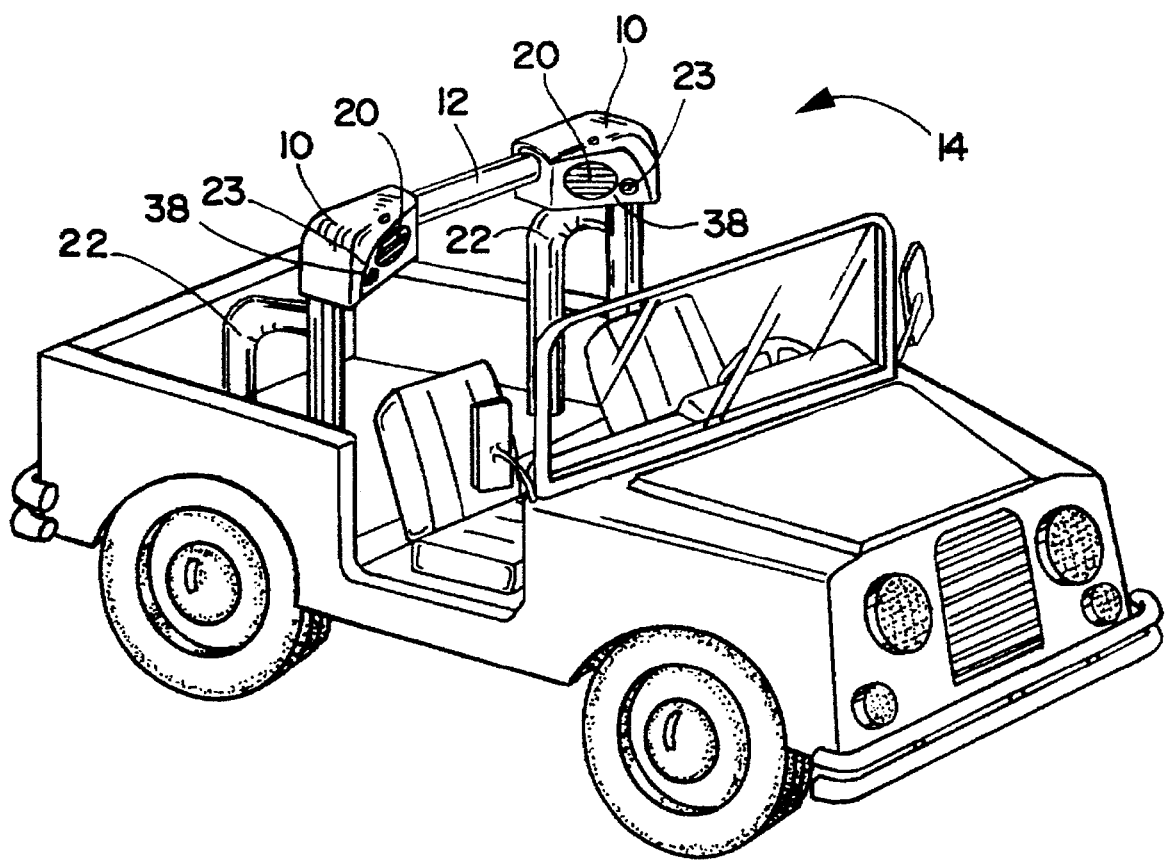
FIG. 5 is a perspective view of an off-road vehicle showing the preferred embodiments of the speaker mounting assemblies of the present invention, with speakers therein, mounted to the two upper most corners of the rollbar of the vehicle.

As best shown in FIG. 4, the rear shell 16 is sized and dimensioned to fit over a rollbar and the lower shell 18, and includes a substantially straight lower edge 19, a combination straight and curved top portion 21, and an arcuate or curved central portion or opening 24, between the top portion 21 and lower edge 19. The curved top portion 21 and arcuate central portion 24 are sized and dimensioned to take the same general shape as the curvature or diameter of the corner 26 of rollbar 12 to which it is mounted, so as to both blend and cooperate therewith, in an aesthetically pleasing manner and so as to hug, or be captured on the rollbar when mounted thereto. A plurality of openings 28 are formed along the lower edge 19 and adjacent the arcuate central portion 24 of rear shell 16 and plurality of aligned and complementary openings 30 are formed to the front shell 18, to enable the front and rear shells 16 and 18 to be secured together, by plurality of securing means 30, preferably at least ten (10), such as nuts and bolts, plastic screw locks 30 of the type that expand on insertion and tightening in the complementary openings 28, 30, or the like, to firmly and positively secure the front and rear shells together and to the rollbar 12. To further prevent tampering and removal of the shells 16, 18 when secured together on the rollbar 12 by the securing means 30, at least one, and preferably two key operated locking means 32 are inserted and held in opening 34 in the shell section 16, and cooperate with and lock in openings 36 formed in front shell 18, for locking the shells together on the rollbar 12.

Figure 2:
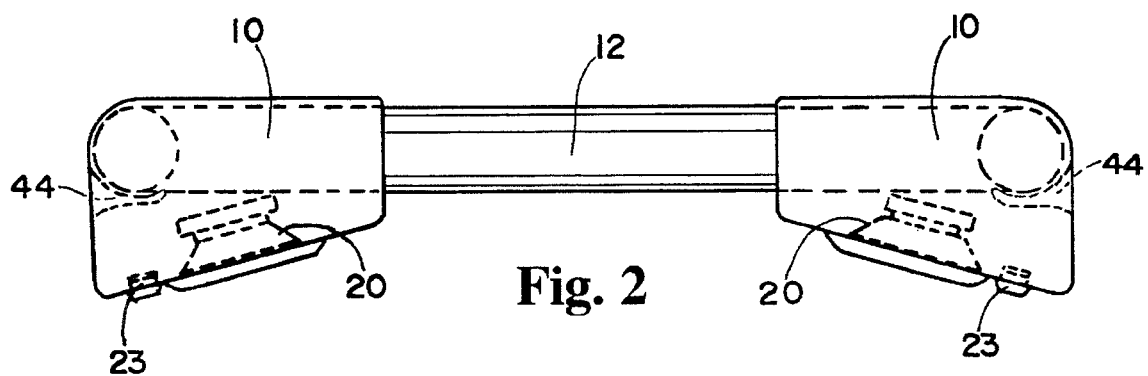
FIG. 2 is a top plan view of the mounting assemblies and speakers mounted to the rollbar of FIG. 1.
Figure 3:
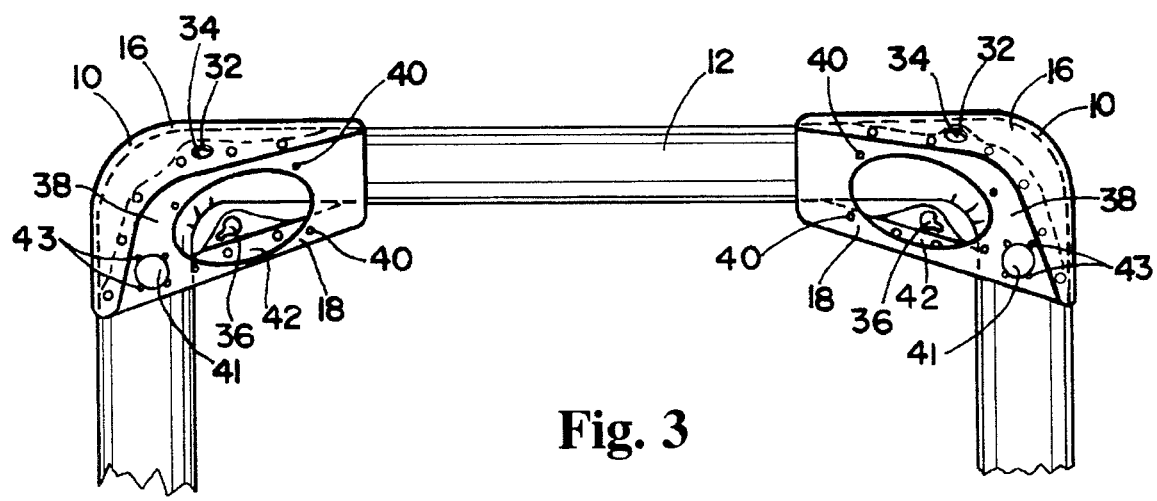
FIG. 3 is a partial front elevational view similar to that shown in FIG. 1, with the front grills and speakers removed from the mounting assemblies to show further details of the interior of the speaker mounting assemblies.

As best shown in FIGS. 1–3, when assembled to the rollbar 12, the shell 16 overlaps shell 18 in a watertight manner (or if desired gasket or sealing means may be applied or used therebetween, to prevent the entry of moisture into the speaker mounting assemblies on the rollbar 12. Furthermore, when assembled together, the front face 38 of front shell 18 is preferably shaped as shown to incline or slant downwardly, toward the interior of the vehicle so as to direct the sound downwardly, and to also provide a more aerodynamic appearance as well as less wind resistance when an open vehicle is moving.

The speakers are preferably at least 6"×9", while the speakers 23, if used, are smaller, such as tweeters. These speakers are mounted in openings 40, 41 formed in the front face 38 of shell 18, in any manner known to those skilled in the art, and are securely held in the speaker mounting means 10, as by a plurality of securing means passing through a plurality of openings 42, 43 formed in the face 38.

As best shown in FIG. 2, with the speakers 40, 41 in position, or a light or other accessories mounted in place of tweeter 41 in the assemblies 10 secured to the rollbar 12, the shell 16 is provided with a curved stop means 44, secured to or integrally formed internally thereof, and cooperates with the rollbar 12, or any covering material on the rollbar, to prevent any unwanted rotation or movement of the speaker mounting assemblies on or along the rollbar. If desired, further friction means, such as foam rubber or the like may be added to the stop means 44 to aid in gripping the surface of the rollbar, or any covering material thereon.

The key 33 and the locking mechanism 32 which it operates within the speaker mounting assemblies are preferably substantially made and extremely strong items, highly resistant to corrosion, so as to provide the extra strength needed to retain the speaker mounting assemblies in the locked position, if any unauthorized attempts are made to remove the same.

As described above, the speaker mounting assemblies of the present invention when mounted to the rollbar of a vehicle, such as a sports utility vehicle with the speakers directed or extending toward the passenger area for enhanced and improved sound quality. And, although the speaker mounting assemblies of the present invention may be used to replace the existing speakers means in a vehicle, they may also be used as an addition to or a complement to the existing speakers. Therefore, either with the existing speakers in position, or with any such speakers removed, the speaker mounting assemblies are secured to the rollbar of the vehicle so as to be properly directed to present enhanced listening pleasure to the passengers in the vehicle wherever it is being operated.

It, therefore, can be seen that the key operated locking means 32, plus the securing means 30 of the speaker mounting assemblies of the present invention provide additional and adequate security to prevent accidental or easy removal from the rollbar of the vehicle, in a facile manner so as to substantially eliminate or prevent to vandalism, or accidental removal because of a bumpy off-road ride.

It, thus, can be seen that the speaker mounting assemblies of the present invention provide an improved means for mounting speakers in an off-road vehicle heretofore unattainable, which speaker mounting assemblies may be easily installed in and locked to substantially any rollbar of the various vehicles which have been or are presently being sold.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What I claim is:

1. A speaker mounting assembly having an interior surface and an exterior surface for mounting to a rollbar of a vehicle comprising, in combination:
    a substantially elongated first shell and a substantially elongated second shell;
    means for securing said first and second substantially elongated shells to and around said rollbar of said vehicle;
    at least one speaker mounted to an opening formed in one of said first and second shells;
    a plurality of further securing means cooperating with a plurality of aligned openings in said first and second shells to secure said first and second shells together; and
    means for locking said first and second substantially elongated shells together to prevent their unauthorized removal from said rollbar.

2. The speaker mounting assembly of claim 1 wherein there are two speaker mounting assemblies secured to said rollbar.

3. The speaker mounting assembly of claim 2 wherein their are two locking means locking said secured together shells of said two speaker mounting assemblies together to prevent their unauthorized removal from said rollbar.

4. The speaker mounting assembly of claim 2 wherein each of said substantially elongated first and second shells is sized and dimensioned to fit snugly around said rollbar so as to be firmly clamped thereto by said plurality of securing means, and wherein a stop means is formed to the interior surface of said speaker mounting assembly to prevent movement of said speaker mounting assembly.

5. The speaker mounting assembly of claim 4, wherein said substantially elongated first shell is a larger rear shell and said substantially elongated second shell is a smaller front shell.

6. The speaker mounting assembly of claim 5 wherein said at least one speaker is secured in an opening formed in said smaller front shell.

7. The speaker mounting assembly of claim 6 wherein said smaller front shell is inclined so as to direct sound emanating from said at least one speaker mounted therein into the passenger area of said vehicle.

8. The speaker mounting assembly of claim 5, wherein said larger rear shell overlaps said smaller front shell so as to make said assembled speaker mounting assembly substantially water-resistant.

9. The speaker mounting assembly of claim 8, further including a keyhole formed to said locking means to allow said locking mechanism to only be actuated by a key.

10. A speaker mounting assembly mounted to a rollbar of vehicle comprising, in combination:
    a substantially elongated larger first shell and a substantially elongated smaller second shell;
    a pair of the larger first shells and a pair of the smaller second shells secured to and around said rollbar of said vehicle;
    at least one speaker mounted to an opening formed in each of the smaller second shells;
    a plurality of securing means cooperating with a plurality of aligned openings in each of said larger first shells and said smaller second shells to secure said larger first shells to said smaller second shells to said rollbar in different positions; and
    means for locking each of the larger first shells and smaller second shells together to prevent their unauthorized removal from said rollbar.

11. The speaker mounting assembly of claim 10 wherein their are two locking means locking said larger first and said smaller second shells together on said rollbar to prevent their unauthorized removal.

12. The speaker mounting assembly of claim 11 wherein each of said larger first shells and said smaller second shells is sized and dimensioned to fit snugly around said rollbar so as to be firmly clamped thereto by said plurality of securing means, and wherein a stop means is formed to the interior surface of each of said speaker mounting assemblies to prevent movement thereof on said rollbar.

13. The speaker mounting assembly of claim 12, wherein there are two speakers and one of said two speakers is secured in an opening formed in each of said smaller second shells.

14. The speaker mounting assembly of claim 13 wherein to second face of each of said smaller front shells is inclined so as to direct sound emanating from said at least one speaker mounted therein into the passenger area of said vehicle.

15. The speaker mounting assembly of claim 12, wherein each of said larger first shells overlaps one of said smaller second shells so as to make each of the secured together speaker mounting assemblies formed thereby substantially water-resistant.

16. A pair of speaker mounting assemblies for a vehicle rollbar comprising in combination:
    a pair of substantially elongated larger first shells and a pair of substantially elongated smaller second shells;
    one each of the larger first shells and one each of the smaller second shells sized and dimensioned so as to be secured together and around said vehicle rollbar;
    at least one speaker mounted to an opening formed in each of the smaller second shells;
    a plurality of securing means cooperating with a plurality of aligned openings in each of said larger first shells and said smaller second shells to secure said larger first shells to said smaller second shells in overlapping relationship on said rollbar; and
    locking means holding said larger first shells and said smaller second shells together to prevent the unauthorized removal of said larger first shells and said smaller second shells from said rollbar.

17. The pair of speaker mounting assemblies of claim 16, wherein there are at least two locking means locking said larger first shells and said smaller second shells together on said rollbar.

18. The pair of speaker mounting assemblies of claim 17 wherein each of said larger first shells and said smaller second shells is sized and dimensioned to fit snugly around said rollbar so as to be firmly clamped thereto by said plurality of securing means, and wherein a stop means is formed in an interior surface of each of said pair of speaker mounting assemblies to prevent movement thereof on said rollbar.

19. The pair of speaker mounting assemblies of claim 18, wherein said at least one speaker is secured in an opening formed in each of said smaller second shells.

20. The pair of speaker mounting assemblies of claim 19 wherein each of said smaller front shells has an inclined front face and each of the inclined front faces directs sound emanating from said at least one speaker mounted therein into the passenger area of said vehicle.

* * * * *